United States Patent [19]

Cohen

[11] Patent Number: 4,576,478

[45] Date of Patent: Mar. 18, 1986

[54] OPTICAL INSTRUMENT FOR MEASURING ANGLES

[76] Inventor: Edwin J. Cohen, 20 Moreland Ct., Lyndale Ave., London NW2, England

[21] Appl. No.: 410,949

[22] Filed: Aug. 24, 1982

[30] Foreign Application Priority Data

Sep. 11, 1981 [GB] United Kingdom ............... 8127492

[51] Int. Cl.⁴ .............................................. G01C 1/10
[52] U.S. Cl. ...................................... 356/149; 33/283
[58] Field of Search .............. 356/143, 148, 149, 248, 356/250; 33/283

[56] References Cited

U.S. PATENT DOCUMENTS 544,212  8/1895  Croskery ............................ 356/250
2,411,870  12/1946  Chauvet ............................. 356/149

FOREIGN PATENT DOCUMENTS 17752  of 1899  United Kingdom ................ 356/149
13320  of 1912  United Kingdom ................ 356/248

Primary Examiner—R. A. Rosenberger
Attorney, Agent, or Firm—Shapiro and Shapiro

[57] ABSTRACT

A pendulum is mounted between an eyepiece and a fixed reflector facing a movable reflector carried by an adjustment member. First and second sight guides are mounted on the pendulum in alignment with a longitudinal axis which is perpendicular to the axis of the pendulum and this longitudinal axis is movable into coincidence with the axis of the eyepiece. The axis of the eyepiece is thus aligned horizontally, by gravity, without having to view the horizon through the eyepiece.

1 Claim, 6 Drawing Figures

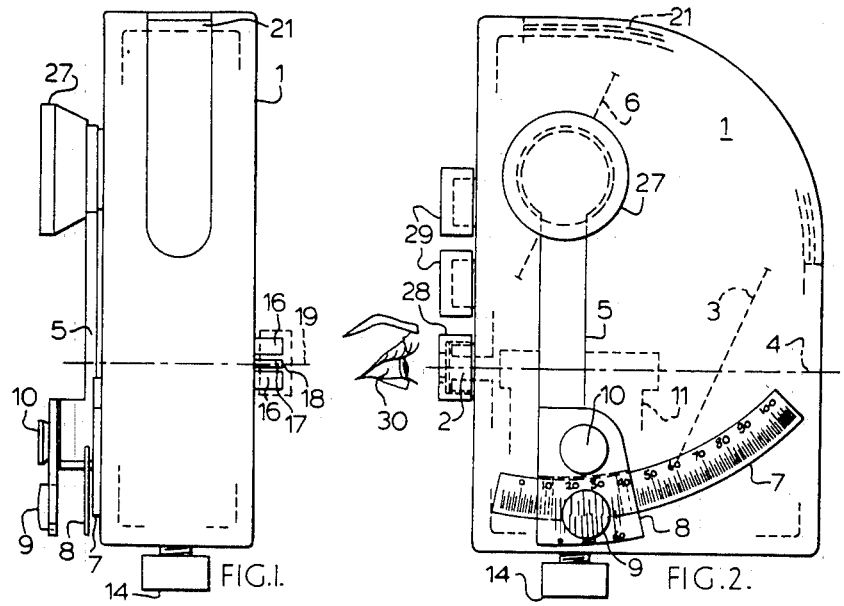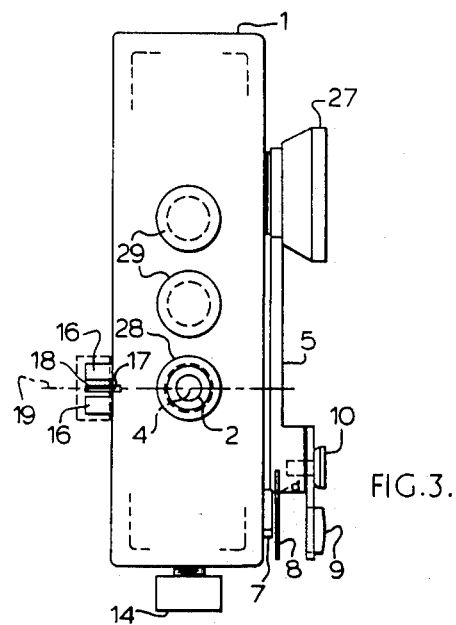

OPTICAL INSTRUMENT FOR MEASURING ANGLES

TECHNICAL FIELD

The invention relates to optical instruments for measuring angles and, in particular, although not exclusively, to navigational instruments such as sextants and octants for measuring the inclination of celestial bodies.

BACKGROUND ART

Known optical instruments for measuring angles, such as sextants and octants, comprise support means in the form of a frame; an eyepiece mounted on the support means; a first reflector, known as a "horizon glass", mounted on the support means in alignment with the axis of the eyepiece; an adjustment member, known as an "index bar", pivotally mounted on the support means; a movable reflector mounted on the adjustment member so as to face towards the first reflector; and measuring means comprising an angularly graduated "arc" for measuring movement of the adjustment member. The support means comprise first and second arms extending divergently from a hub and interconnected at their free ends by an arcuate limb. The eyepiece and first reflector are respectively mounted on the first and second arms and the adjustment member carrying the movable reflector is pivotally mounted in the hub at the junction of the first and second arms.

To use an instrument of this type to measure the inclination of a celestial body, such as the sun or a star, it is necessary to hold the instrument with the optical axis of the eyepiece aligned with the horizon so that the horizon may be viewed through the eyepiece and a non-reflective portion of the horizon glass and then, with the pivotal axis of the hub arranged horizontally, above the optical axis of the eyepiece, to measure the angular movement of the adjustment member from a datum position in which the movable reflector is parallel to the first reflector to a position in which light from the celestial body is reflected from the movable reflector to the first reflector and back along the optical axis of the eyepiece so that the celestial body can be viewed through the eyepiece. This angular movement is equal to half the angle of inclination of the celestial body from the axis of the eyepiece. This is consistent with the law of optics whereby the angle between the first and last directions of a beam of light which is reflected twice, by two plain reflective surfaces, is twice the angle between the two reflective surfaces. By reference to navigational tables, it is possible to establish from such inclinations the positions from which measurements have been made.

Although an octant, in which the first and second arms are inclined at 45°, is capable of measuring 45° movement of the adjustment member and therefore 90° of inclination from an axis extending from the eyepiece to the horizon, this is not sufficient for measuring all inclinations if the instrument is used by an operator standing on an elevated platform such as the bridge of a ship. In this case, the axis extending from the eyepiece to the horizon dips below horizontal and so the maximum elevation which can be measured is less than vertical. To overcome this disadvantage, it is necessary to use the more expensive sextant in which the first and second arms are inclined at 60° and which is capable of measuring inclinations of up to 120° from the optical axis of the eyepiece.

In any case, to be of value, conventional sextants and octants have to be accurately made and are thus often too expensive for all but the most serious and professional navigators. Moreover, these instruments are particularly difficult to use, and cannot be used at all when the horizon is obscured by haze or at night. The elevations of stars must therefore be measured during twilight, at dusk and dawn, when both the stars and the horizon are visible. Clearly, on very many occasions when the horizon is indistinct, the great precision of navigational instruments such as sextants and octants is unnecessary in view of the unavoidable error in aligning the optical axis of the eyepiece with the horizon.

One known technique for modifying a conventional sextant or octant so as to make it possible to measure inclinations when the horizon is not visible is to provide the instrument with a spirit level and complex optical means which enable an operator to view an artificial horizon when the instrument is held so that the optical axis of the eyepiece extends horizontally. However, the resultant instrument, known as a "bubble sextant", does not work satisfactorily and has never been widely accepted by navigators. The modification increases the complexity of the instrument with attendant difficulty in keeping the instrument in accurate operating adjustment, and the cost is considerably higher than for conventional sextants and octants.

DISCLOSURE OF THE INVENTION

It is intended, by means of the present invention, to provide an angle measuring instrument in which these disadvantages are at least partly avoided by providing an instrument which is less complex and less expensive than a bubble sextant, but which is provided with means for indicating when the optical axis of the eyepiece is aligned with a particular orientation.

This is achieved by mounting a pendulum between the eyepiece and the first reflector for pendulous movement in a swinging plane extending in the same direction as the axis of the eyepiece; and by mounting, at separate positions on the pendulum and spaced from the axis of the eyepiece, first and second sight guides for alignment, with respective portions of the axis of the eyepiece when the pendulum is in its lowermost, rest position.

The invention therefore provides an optical instrument, for measuring angles, comprising support means, an eyepiece mounted on the support means; a first reflector mounted on the support means in alignment with the axis of the eyepiece; a pendulum mounted between the eyepiece and the first reflector for pendulous movement in a swinging plane parallel to a plane which is extending in the same direction as the axis of the eyepiece; first and second sight guides mounted at separate positions on the pendulum and spaced from the axis of the eyepiece for alignment, with respective portions of the axis of the eyepiece, when the pendulum is in its lowermost, rest position; an adjustment member pivotally mounted on the support means; a movable reflector mounted on the adjustment member so as to face towards the first reflector; and measuring means for measuring movement of the adjustment member.

Naturally, the first reflector is held fixed during each measuring operation, but may be adjustable to different positions for different measuring operations.

To measure the inclination of an object, such as a celestial body, the adjustment member is moved into a first position in which the movable reflector is parallel to the fixed, first reflector. The instrument is then held so that the pendulum hangs vertically and the support means are tilted until the axis of the eyepiece is aligned with the first and second sight guides. With the instrument in this condition, it is possible to view objects along a line of sight, extending from the movable reflector, which is parallel to the axis of the eyepiece. Thus, unless the instrument is in an elevated position, it will be possible to see the horizon on the line of sight if the horizon is visible. The adjustment member is then moved to a second position in which the light from the object is reflected back along the axis of the eyepiece so that the object becomes visible through the eyepiece. The inclination of the object, from the horizontal, is twice the angle traversed by the adjustment member in moving from the first to the second position.

For convenience, the fixed reflector may be provided with a transversely extending marking which intersects the axis of the eyepiece when the pendulum is in its lowermost, rest position. Alternatively, the eyepiece may be provided with a cross-hair for alignment with the first and second sight guides, particularly where the eyepiece is in the form of a telescope.

As the period of swing of the pendulum will be directly proportional to the square root of the length of the pendulum, the frequency of swing can be increased so that it is much higher than the frequency of movement experienced by floating vessels, simply by providing a pendulum of suitably short length, therefore allowing the instrument to be made more compact. To reduce the movement undergone by the first and second sight guides, these sight guides may be mounted closer to the swinging axis than the centre of gravity of the pendulum.

The invention thus makes use of the infallible verticality obtained by the earth's gravity by way of a small, but relatively heavy pendulum which, when not at rest, swings rapidly with relatively minute oscillations which take a very short time traversing the lowermost, rest position of the pendulum. These minute periods of time are so relatively small, when compared with the rocking period of a vessel, which is pitching, rolling and yawing in the water, that this movement of the vessel does not appreciably affect the motion of the pendulum. It should also be noted that the pendulum can be constructed so that the movement and period of its swing are so short that it is not necessary to wait for the pendulum to come to rest before taking a measurement. Instead, it is possible to take a measurement as soon as it is clear that the first and second sight guides carried by the pendulum are oscillating about a mean position coincident with the axis of the eyepiece.

The first and second sight guides may be provided by opposite ends of a passage extending through or transversely of the pendulum, along a plane parallel to the swinging plane. However, in a preferred embodiment, each sight guide comprises a pair of spaced, axially aligned pins disposed on opposite sides of the axis of the eyepiece on an axis which perpendicularly intersects the axis of the eyepiece when the pendulum is in its lowermost, rest position.

The first and second sight guides are preferably aligned with spaced portions of a longitudinal axis which extends perpendicular to the axis of the pendulum, from the pivotal axis to the centre of gravity. However, this longitudinal axis need not be perpendicular to the axis of the pendulum.

The adjustment member is preferably movable from a datum position in which the movable reflector is parallel with the fixed reflector. This is particularly useful when the longitudinal axis between the first and second sight guides is perpendicular to the axis of the pendulum because, when the pendulum is in its lowermost, rest position and the axis of the eyepiece is coincident with the longitudinal axis between the first and second sight guides, a horizontal beam of light incident to the movable reflector will be reflected back along the axis of the eyepiece. The inclination of the movable reflector, on movement of the adjustment member from its datum position, will then be proportional to the inclination from horizontal of a beam of light from an object viewed through the eyepiece.

To measure angles in planes other than the vertical, releasable locking means are provided for temporarily locking the pendulum relative to the support means and the support means are provided with a front sight and a back sight respectively disposed on spaced parts of an aiming axis which extends parallel to the axis of the eyepiece in a sighting plane which is perpendicular to the swinging plane swept by the axis of the pendulum.

In use of an instrument modified in this way, the adjustment member is moved into a first position in which the movable reflector is parallel to the fixed reflector. The instrument is then held in its normal position, with the pendulum hanging vertically, for measuring angles in a vertical plane. When the support means have been tilted until the axis of the eyepiece is coincident with the longitudinal axis between the first and second sight guides, the pendulum is releasably locked relative to the support means. With the instrument in this condition, it is possible to view objects along a line of sight, extending from the movable reflector, which is parallel to the axis of the eyepiece. The instrument is then tilted until the plane defined by the axis of the eyepiece and the line sight extending from the movable reflector is parallel with the plane of the angle to be measured. The front and back sights are then aligned with one of the markers subtending the angle to be measured and then, while holding the instrument in this position, the adjustment member is moved to a second position in which light from the second of the markers subtending the angle to be measured is reflected back along the axis of the eyepiece. The angle between the two markers is twice the angle traversed by the adjustment member in moving from the first position to the second position.

In order to protect the instrument from the deleterious effects of water spray and other contaminants, the support means may be provided in a form, such as a box, which will enclose the pendulum, the fixed reflector and the movable reflector and include a window for viewing objects on lines of sight extending from the movable reflector. In this case, the adjustment member, the measuring means and any front sight and back sight may be provided externally of the enclosing support means. To supplement external light coming into the enclosing support means through the window, battery operated internal lighting may be provided. Where the fixed reflector is provided with a reference marking, this marking may be illuminated by the internal lighting and the internal lighting may even comprise a small fluorescent tube mounted behind a transparent portion of the fixed reflector, formed by a score mark in a reflective layer of this fixed reflector.

An embodiment of the invention is hereinafter described, by way of example, with reference to the accompanying drawings.

BRIEF DESCRIPTION OF THE DRAWINGS

FIGS. 1, 2 and 3 are front, side and rear elevations of an octant in accordance with the present invention;

MODE FOR CARRYING OUT THE INVENTION

Figures 4, 5, 6:
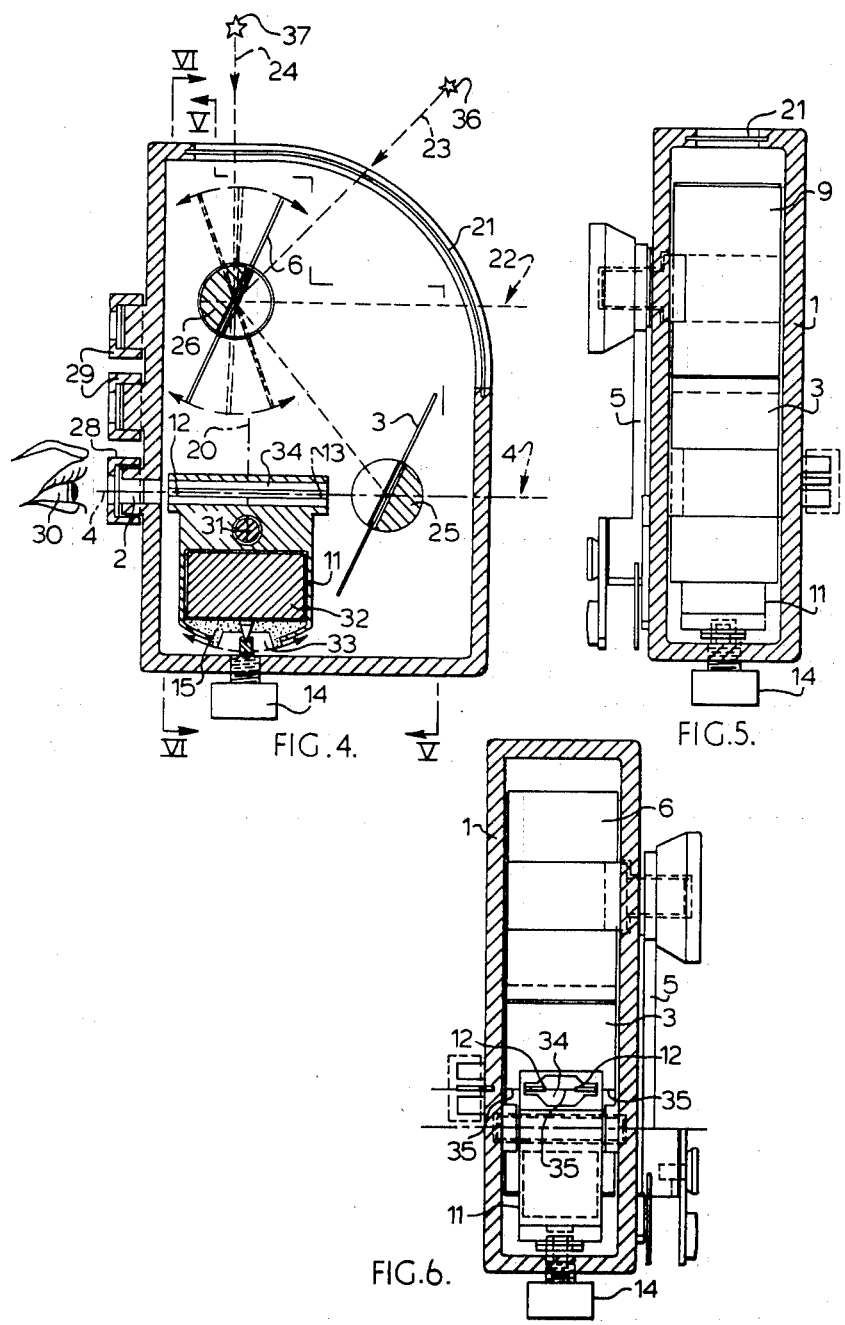
FIG. 4 is a sectional side elevation of the octant shown in FIGS. 1 to 3.
FIGS. 5 and 6 are sectional elevations of the octant, taken across the Sections V—V and VI—VI.

As shown in FIGS. 1 to 6, a box 1 providing support means for the octant is formed with an apertured eyepiece 2 having an axis 4 and encloses fixed and movable reflectors 3 and 6. The fixed reflector 3 is mounted on a boss 25 at an angle of 25° to the front and rear walls of the box 1. The movable reflector 6 is mounted on a boss 26 projecting into the box 1 from an adjustment member 5. The adjustment member 5 is provided with a knob 27 to facilitate rotation of the boss 26 in an aperture formed in the box 1. The free end of the adjustment member 5 co-operates with an arcuate scale 7 and carries a vernier 8 and a magnifying glass 9, for reading the vernier 8, which is pivotally mounted on the adjustment member 5 by pivot member 10.

A front sight 16, comprising two laterally spaced members and a back sight 17, comprising a single blade, are mounted on the opposite side of the box 1 to the adjustment member 5, respectively adjacent the front and rear ends of the box 1. The top surfaces of the front sight 16 and the back sight 17 are aligned with an aiming axis 18 which extends parallel to the axis 4 of the eyepiece 2 in a sighting plane 19 which is perpendicular to the swinging plane swept by the axis 20 of a pendulum 11.

The eyepiece 2 is fitted with a sun-shade cap 28 for use when measuring the inclination of the sun. Two further sunshades 29, of different density, are removably mounted on studs provided on the front end of the box 1. Light from the sun, entering the box 1 through arcuate window 21 passes through the sunshade 28 before entering the viewer's eye 30.

As shown more clearly in FIG. 4, the pendulum 11 is pivotally mounted on a support pin 31 extending between the side walls of the box 1. The pendulum 11, like the box 1 and the adjustment member 5, may conveniently be made of plastic. However, the pendulum 11 also includes a massive weight 32, which is suitably of lead. A locking screw 14, in screw-threaded engagement in an aperture in the bottom wall of the box 1, is engageable with a rubber cushion 15 secured to the underside of the weight 32 for locking the pendulum 11 relative to the box 1. When the screw 14 is disengaged from the cushion 15, swinging movement of the pendulum 11 is limited by engagement between the tip of the screw 14 and the ends of a slot 33 formed in the cushion 15.

A passageway 34, formed in the pendulum 11 on the opposite side of the pivot pin 31 to the weight 32, is aligned between the eyepiece 2 and the fixed reflector 3. As shown more clearly in FIG. 6, two spaced pins 12 aligned on an axis extending transversely of the axis 4 of the eyepiece 2 provide a first sight guide at the end of the passageway 34 adjacent the eyepiece 2. Two spaced pins 13 provide a second sight guide at the end of the passageway 24 and adjacent the fixed reflector 3. The longitudinal axis between the first and second sight guides is perpendicular to the axis 20 of the pendulum 11 so that when the pendulum 11 is in its lowermost, rest position, with its axis 20 vertical, the longitudinal axis between the first and second sight guides is horizontal. The first and second sight guides are also arranged so that when the box 1 is tilted until the axis 4 of the eyepiece 2 is horizontal, it is also aligned with the first and second sight guides and with a transverse marking 35 on the reflective surface of the fixed reflector 3.

When the movable reflector 6 is parallel with the fixed reflector 3, as shown in unbroken line, light travelling from an object along a horizontal line of sight 22 is reflected back along the axis 4 of the eyepiece 2 into the eye 30 of an observer, when the axis 4 is horizontal. In order to view objects, such as stars 36 and 37 along lines of sight 23 and 24, respectively, it is necessary to rotate the movable reflector 6 into the positions shown, respectively, in dashed outline and in dotted outline, in FIG. 4. This is achieved by rotating the movable reflector 6 respectively through 22½° and through 45°, i.e. through one half of the angles of inclination of the stars 36 and 37. It is therefore appropriate to mark the scale 7 and the vernier 8 with 2 to 1 graduations.

To measure the angle subtended by two horizontally arranged markers, the adjustment member 5 is moved into a first, datum position in which the movable reflector 6 is parallel with the fixed reflector 3. The octant is then arranged so that the axis 4 of the eyepiece 2 is horizontal and the pendulum 11 is then locked relative to the box 1 by tightening the screw 14 until it engages the rubber cushion 15. The octant is then laid on its side, with the front sight 16 and back sight 17 uppermost. The octant is rotated until the aiming axis 18 is directed at the first of the markers subtending the angle to be measured. With the octant held in this position, the adjustment member 5 is rotated until the second marker can be viewed through the eyepiece 2. The angular movement of the adjustment member 5 is one half of the angle subtended by the two markers and so this angle can be read from the scale 7.

While a preferred form of the invention has been shown and described herein, it will be apparent to those skilled in the art that various changes and modifications are possible within the scope of the invention as defined in the appended claims.

The invention claimed is:

1. An optical instrument for measuring angles, comprising:
    support means defining an enclosure;
    an eye piece mounted externally on the support means;
    a first reflector mounted internally of the support means in alignment with a horizontal axis of the eye piece;
    an adjustment member pivotally mounted externally on the support means;
    a movable reflector mounted on the adjustment member and disposed internally of the support means in an orientation so as to face toward the first reflector, the support means having a window intersecting lines of sight extending from the movable reflector;
    measuring means for measuring pivotal movement of the adjustment member;

pendulum means mounted internally of the support means and located between the eye piece and the first reflector for pendulous movement in a swinging plane extending in the same direction as the axis of the eye piece;

and means for temporarily locking the pendulum in its lowermost, rest position relative to the support means, said pendulum having first and second pairs of sight guide pins attached thereto at spaced locations along a guide axis which lies coincident with the axis of the eye piece when the pendulum is in its lowermost, rest position, each pair of sight guide pins including two pins spaced from the guide axis on opposite sides thereof and aligned axially with one another perpendicular to the guide axis, whereby each of said pairs of guide pins aligns horizontally with the axis of the eye piece when the pendulum is in its lowermost, rest position.

* * * * *